(12) United States Patent
Carle et al.

(10) Patent No.: US 7,642,394 B1
(45) Date of Patent: Jan. 5, 2010

(54) METHODS FOR RECYCLING WASTE

(75) Inventors: Kenneth E. Carle, Merrillville, IN (US);
Kevin P. Prunsky, Orland Park, IN (US)

(73) Assignee: Pollution Control Industries, Inc., East Chicago, IN (US)

( * ) Notice: Subject to any disclaimer, the term of this patent is extended or adjusted under 35 U.S.C. 154(b) by 563 days.

(21) Appl. No.: 11/077,605

(22) Filed: Mar. 11, 2005

Related U.S. Application Data

(60) Provisional application No. 60/552,495, filed on Mar. 12, 2004.

(51) Int. Cl.
*A62D 3/40* (2007.01)

(52) U.S. Cl. .................. 588/321; 588/312; 201/2.5; 201/3; 201/25; 201/30; 203/14

(58) Field of Classification Search ............. 201/2.5, 201/3, 25, 30; 588/312, 321; 203/DIG. 9, 203/14; 159/11.1
See application file for complete search history.

(56) References Cited

U.S. PATENT DOCUMENTS

| | | | | |
|---|---|---|---|---|
| RE26,891 E | * | 5/1970 | Reid | 210/181 |
| 4,153,514 A | * | 5/1979 | Garrett et al. | 201/2.5 |
| 4,872,954 A | * | 10/1989 | Hogan | 202/105 |
| 5,342,421 A | * | 8/1994 | Breu | 96/279 |
| 5,608,136 A | * | 3/1997 | Maezawa et al. | 588/316 |
| 6,039,774 A | * | 3/2000 | McMullen et al. | 48/102 A |
| 6,244,198 B1 | * | 6/2001 | Suominen | 110/342 |
| 2002/0100710 A1 | * | 8/2002 | Hogan | 208/13 |

* cited by examiner

*Primary Examiner*—N. Bhat
(74) *Attorney, Agent, or Firm*—Ballard Spahr LLP

(57) ABSTRACT

Systems and methods for recycling waste and reclaiming beneficial and useful compositions such as organic solvents comprises a shredder, operating in an inerted or anaerobic atmosphere, which shreds the waste into smaller pieces that are fed into and indirectly heated in an anaerobic desorption unit so as to vaporize at least one organic compound associated with the waste. A vacuum means is used to transfer the organic compound vapors from the desorption unit to a water quench condensing unit that operates to produce a mixed organic compound liquid stream. The liquid organic compound and water stream is then processed in an oil and water separator. The water is separated and can be reused in the system for quenching gas vapors or inerting the desorption unit. The water-free mixed organic compound liquid stream is then fed into a multi-stage packed distillation column separating organic compound according to boiling points to produce products such as organic solvents.

11 Claims, 3 Drawing Sheets

METHODS FOR RECYCLING WASTE

REFERENCE TO RELATED APPLICATIONS

This application claims the priority of U.S. Provisional Patent Application No. 60/552,495, filed Mar. 12, 2004, which is herein incorporated in its entirety.

FIELD OF THE INVENTION

This invention relates to systems and methods for recycling waste material. Particularly, this invention relates to systems and methods for recycling solid waste material to produce beneficial and useful products.

BACKGROUND OF THE INVENTION

Disposal of waste material, whether hazardous or non-hazardous, has been a concern for many. In the past, waste material was disposed of by merely dumping the waste material into landfills. However, this disposal of waste material has led to contamination of groundwater by, among others, radionuclides, biological agents, and inorganic and organic chemicals, which in turn have caused chronic illnesses in people and animals, and have destroyed natural resources.

In response to the need to prevent further contamination of the groundwater, the government enacted regulations that aim to protect the environment from such seepage of contaminants from waste material. Thus, the disposal of waste material has become a costly venture, as companies disposing of hazardous or solid waste material must comply with government regulations.

Additionally, the U.S. Environmental Protection Agency ("EPA") proposed a hierarchy of preferred waste management options. In the hierarchy, waste prevention is the most desirable goal, but when waste cannot be prevented, the EPA recommends that the waste material be recycled. The EPA has stated that the disposal of waste material in landfills, the least desirable alternative, should be avoided if possible.

In response, systems have been developed to recycle waste material. Recycling solid waste material and converting it into or reclaiming valuable products, such as solvents, is beneficial to the environment because it reduces pollution and greenhouse gasses such as carbon dioxide, methane and nitrous oxide; reduces the need to extract and process raw materials to manufacture new products; and conserves natural resources. Additionally, recycling is economical—avoiding the costly procedure of waste material disposal.

Conventional systems for recycling waste material are inadequate because they fail to recycle a broad range of solid waste material into beneficial and useful products.

Therefore, what is needed are systems and methods that can recycle solid waste material into beneficial and useful products such as organic solvents, while addressing the deficiencies of the prior art systems.

SUMMARY OF THE INVENTION

The present invention comprises systems and methods for recycling waste material and reclaiming beneficial and useful products, including liquid hydrocarbons, such as organic solvents, and solid residue substantially free of volatile compounds. The present systems include an embodiment thereof having a shredder to shred the waste material into smaller pieces. The system then directs the shredded solid waste into a desorption unit, which vaporizes hydrocarbons in the shredded solid waste material by indirectly heating the shredded solid waste material to high temperatures in the range from about 300° C. to about 800° C. for approximately 30 to 120 minutes. The waste material is not in direct contact with the heat source. The desorption unit operates to maintain the structure of the chemical compounds, such as hydrocarbons, vaporized from the shredded solid waste material. The waste material is baked so that the volatile compounds are vaporized, but not chemically modified. For example, hydrocarbons are released from the waste material. A vacuum draws the hydrocarbon vapors off of the waste material and out of the desorption unit and into a condensing unit, such as a water quench condensing unit, that operates to produce a hydrocarbon/water liquid stream. The solid material remaining after hydrocarbons are volatilized in the desorption unit may or may not be treated further, wherein further treatment is determined based on the composition of the initial waste material and the desired use of the remaining solid material. Water is separated from the hydrocarbon/water stream by hydrocarbon/water separator, such as an oil and water separator. The hydrocarbon liquid stream is then fed into a liquid hydrocarbon separator unit, such as multi-stage packed distillation column, which separates hydrocarbons according to chemical or physical characteristics, such as boiling points. An embodiment of systems and methods of the present invention results in liquid hydrocarbons free from contaminants and separated in specific groups of compounds differentiated by chemical or physical characteristics, such as boiling points.

Other advantages and benefits of the present invention will become apparent upon reading and understanding the present specification when taken in conjunction with the appended drawings.

DETAILED DESCRIPTION

Figure 1:
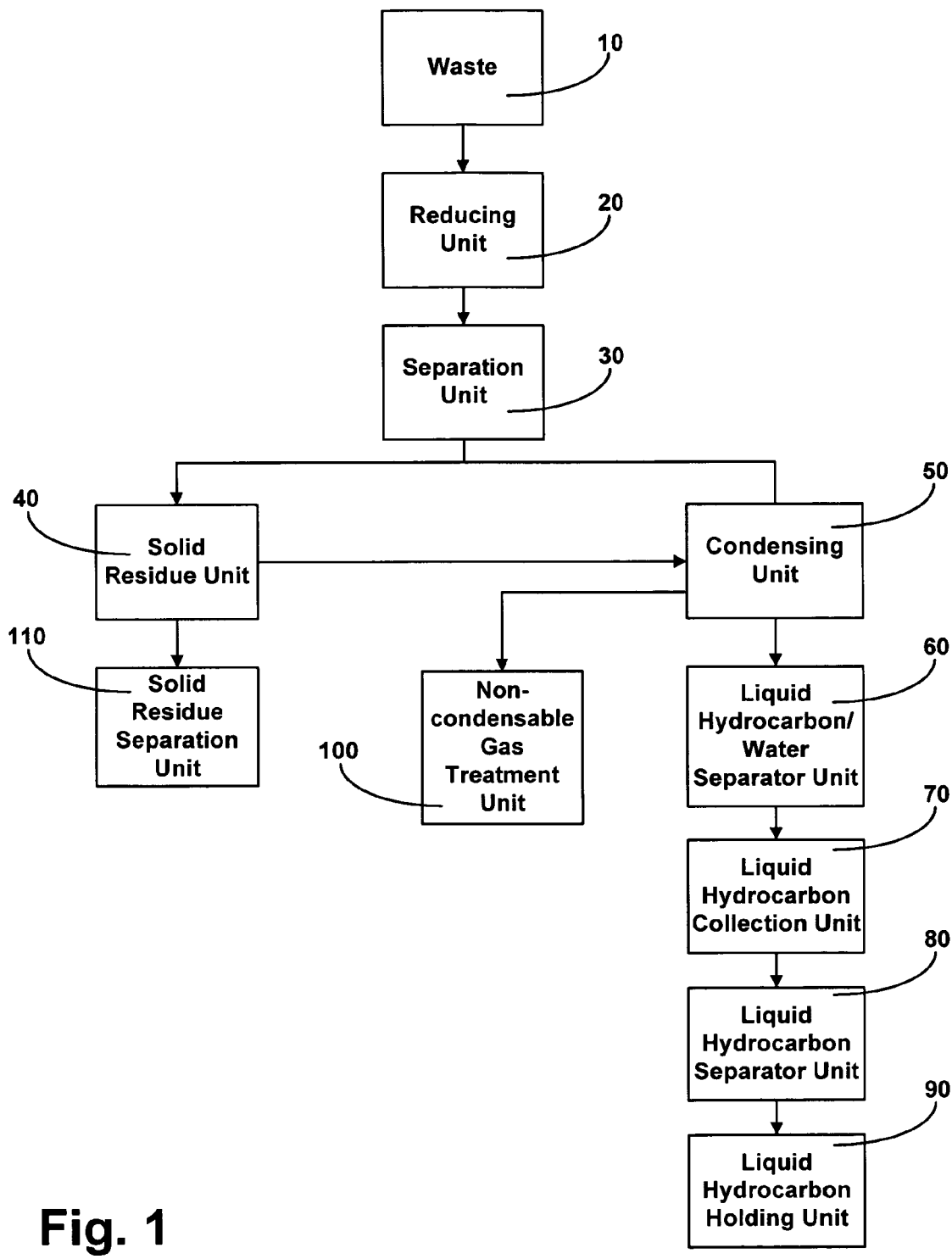
FIG. 1 depicts an embodiment of a solid distillation system.

The present invention comprises methods and systems for treating waste, including solid, liquid or mixtures, hazardous waste, and recycling organic compounds and rendering the waste substantially free from hazardous characteristics such as volatilizable hydrocarbons. The present invention comprises methods and systems for obtaining compounds capable of being volatilized at temperatures between about 300° C. to about 800° C. from materials considered to be waste materials. Methods of the present invention comprise using at least one of a reducing unit, a separation unit, a condensing unit and a liquid hydrocarbon separation unit.

Methods of the present invention further comprise heating waste materials comprising compounds capable of being volatilized or semi-volatilized at temperatures between about 300° C. to about 800° C. in an indirectly heated container, under anaerobic conditions, to temperatures between about 300° C. to about 800° C., removing the volatilized compounds from the heated container, and separating the volatilized compounds. The solid materials, from which the volatile compounds have been removed, are also removed from the heated container. These solid residue materials then have substantially reduced hazardous characteristics, and may be more easily and safely handled. In one aspect of the present invention, the solid residue materials can be used as fuels to provide energy. In another aspect of the present invention, the solid residue materials may be used as ingredients in other uses. For example, solid residue materials can be used as an ingredient in drilling compound formulations to reduce friction in the drilling process for oil and gas wells, wherein the solid residue material of the present invention replaces carbon black in the drilling compound formulation.

The volatile compounds, resulting from heating the waste material, are then separated. Compounds that are lighter in molecular weight and are appropriate fuel molecules, can be used as gas fuels to generate energy, such as by turning a turbine, or can be used in the indirect heating of the container. The container is a part of the separation unit, which is also referred to herein as the desorption unit. The heavier molecular weight materials, which are removed from the waste material, are generally separated by physical or chemical characteristics, known to those skilled in the art, such as by boiling points, molecular weight, freezing point, or separation techniques for specific components such as sulfur or nitrogen. As used herein, the term "anaerobic conditions" means conditions wherein organic compounds, such as hydrocarbons, are not allowed to undergo oxidation or combustion by providing a substantially oxygen-free or oxygen deficient environment. For example, oxygen is purged from the heated container or is replaced with an inert gas, nitrogen, carbon dioxide or steam.

The present invention can be referred to as a solid distillation system for treating organic solid waste that is capable of rendering the starting waste material substantially non-hazardous in that the volatile and semi-volatile compounds are substantially removed, and once removed are recycled or reused. Thermal treatment systems are known in the art wherein solid organic waste is treated by direct heating of the waste material to drive off volatile compounds which then undergo combustion or "burning" to remove the volatile compounds. In contrast, the present invention uses indirect heating of the organic waste in an anaerobic environment such that the volatile and semi-volatile compounds do not undergo combustion. As used herein, volatile compounds are those that vaporize or evaporate at a relatively low temperature, and semi-volatile compounds vaporize or evaporate at higher temperatures. As used herein, the two terms are used interchangeably unless otherwise indicated.

In current usage, waste recycling processes collect waste from a generator and process the material by cataloging and separating it into compatible areas. Waste material is then sorted and sent to various off-site operations for treatment and disposal. This system requires much handling and oversight to meet EPA and Department of Transportation regulations for shipping materials to subsequent off-site locations. As the EPA imposes cradle-to-grave responsibility on the generator for all of the waste material that a company may produce, such shipping and handling of waste material by third parties represents a continuing risk for the waste generator.

The present invention can process organic compound-containing waste material. Once treated, the solid materials remaining after treatment in the present invention have substantially reduced hazardous characteristics, and are useful as a carbon/mineral product. The present invention separates some to all of the semi-volatile and volatile components from the solid components of the waste material, and for most waste material treated in the present invention, a sufficient amount of the organic compounds are removed so that the remaining solid residue material no longer has hazardous characteristics according to current EPA guidelines.

Typical waste materials that can be treated by the present invention, include, but are not limited to, paint waste, solvent-soaked rags or fabrics, resins, tires, polymers, production debris, refinery wastes, plastic parts, crop residue, municipal wastes, drill cuttings, scrap metals, cleaned metals, discarded commercial products, and electronic components, sometimes known as e-wastes. The present invention can process waste material that are hydrocarbons or substituted hydrocarbons in a solid or liquid form, or waste material wherein the hydrocarbons or substituted hydrocarbons are combined, mixed, contained or associated in some fashion with a solid carrier material. For example, a liquid waste material may be combined with a solid carrier and is then processed by the present invention. As used herein, waste material comprises organic compounds capable of being volatilized or semi-volatilized at temperatures between about 300° C. to about 800° C. where the organic compounds are associated with, coating, entrapped by, saturated, contained by, or integral to the material, but can be removed from the material without the compounds undergoing oxidation or combustion. The organic compounds capable of being volatilized by the present invention comprise hydrocarbon and substituted hydrocarbon compounds or molecules, and these terms are used interchangeably unless specifically noted. The use of the term hydrocarbon does not limit the constituents of the compound to only carbon and hydrogen.

The processes and systems of the present invention generally comprise the following steps. Waste materials are collected and tested by qualified technicians to determine the types of organic compounds associated with the wastes. The waste materials are then categorized and safely stored. A specific category of waste material is then selected for treatment. The waste material is fed into a shredder, which reduces all waste materials to a generally uniform size. The size of shredded waste material can be from very small to several feet, such as from millimeters to several meters, with two inch cubic material having been shown to be effective. The size of the material is related to the tipping valve, in that the valves must be capable of moving the particularly sized material. Shredding also helps provide more surfaces for exposure during heating.

After shredding to a relatively uniform size, the waste material is introduced into a indirectly heated container. The waste material is never exposed to direct flame heating, thus it is referred to as indirect heating. In one aspect of the present invention, the heated container is a rotating heated container. In a further aspect of the present invention, shredded waste material is feed continuously to a rotating heated container. The heated container is purged to achieve an anaerobic atmosphere designed to minimize the oxidation and combustion of hydrocarbon components as they are separated from the solid material. As the waste material moves through the rotating heated container, it is heated to very high temperatures. The high temperatures cause the volatile and semi-volatile organic compounds to be separated from the solids. A vacuum is used to remove the volatile and semi-volatile compounds continuously from the heated container. Once removed from the container, the gases are condensed. For example, the gases may be condensed in a manner that forms a water/organic compound mixture and then sent to a water/organic compound separator to be processed. The resulting organic compound mixture is then processed to separate the individual components. For example, the organic mixture may be processed through a fractionation distillation process for reclaiming and recycling organic compounds into industrial processes. If used as a closed loop system, there are no emissions.

Referring now to the drawings in which like numerals represent like elements or steps throughout the several views. FIG. 1 shows a system and methods of an embodiment of the present invention. In general, the waste material is rendered to an appropriate size, as required, and forms a waste stream that is processed by the systems of the present invention.

Referring now to FIG. 1 wherein an exemplary embodiment of solid distillation system of the present invention is described in a process flow diagram. It should be understood, of course, that the process flow diagram of FIG. 1 relates only to one exemplary embodiment of the present invention and that modifications or alterations may be made thereto without departing from the spirit and the scope of the invention as set forth in this disclosure. Waste material 10 is introduced into the solid distillation system, where the waste material may be may comprise any of the materials provided in this disclosure, as well as other waste materials, either solid or liquid, which may or may not be heterogeneous in composition, which further comprise organic compounds such as hydrocarbons which are adsorbed, mixed, adhering, covering or associated with solids that together comprise the waste material, wherein the hydrocarbons may be present in solid, liquid, or vapor form, or some combination thereof, wherein the hydrocarbons may comprise alkanes, alkenes, aromatics and alkynes, and which may further comprise heteroatoms and functional groups, including but not limited to, halogens, oxygen, nitrogen and other heteroatoms known to those skilled in the art.

The waste material is then directed, deposited, fed or otherwise conveyed into a reducing unit 20 which may comprise a hopper or other container to hold and feed the waste material 10 into a shredder or other device designed to render the size of the waste material to a generally uniform size suitable for further processing by the solid distillation system. The reducing unit 20 may further comprise additional components and features as required to efficiently feed waste material into a size reduction component, wherein such additional components and features may comprise methods for heating, cooling, drying, mixing, or containment as required by a user of the present invention. In another embodiment of the present invention, the waste material 10 may not require reduction in size and may be feed directly to the separation unit 30 from the a reducing unit 20 comprising a hopper or other container to hold and feed the waste material. The reducing unit 20 may operate under aerobic or anaerobic conditions.

Waste material 10, after processing by the reducing unit 20, is then conveyed to the separation unit 30. Methods of conveyance for the waste material from the reducing unit 20 to the separation unit 30 comprise conveyor belts, including for example a dragline conveyor, bucket elevators, screw conveyors or other conveyance systems generally known to one skilled in the art. The separation unit 30 further comprises a desorption unit, which may comprise a container such as a rotating drum. The separation unit 30 further comprises a heat system designed to provide heat to the desorption unit. In one embodiment, the heating of the desorption unit is in a manner such that the hydrocarbons in the waste material undergo minimal to no structural modification due to either combustion or oxidation. In an embodiment, the container is slightly inclined in an upward direction from the inlet side to the outlet side of the container.

In one aspect, the desorption unit comprises an inlet door and an outlet door, one or both of which may be automatic, that are used to seal the container from the external environment after the waste material is conveyed into and out of it. In this aspect, the desorption unit further comprises systems that function to create an anaerobic atmosphere such as by purging the interior of the container of oxygen and replacing the air volume of the container with an inert gas, other gases or steam. Oxygen may be purged from the desorption unit by a number of systems which may comprise a vacuum system for removal of atmospheric air, and a delivery system wherein a gas or steam is delivered into the container. Inert gases of the present invention may comprise argon, nitrogen, xenon, carbon dioxide, steam or other gases known to one skilled in the art. The purging system may comprise a vacuum system for removal of atmospheric air, and the delivery system may comprise valves and control systems for automation of the entire purging process. Other methods for purging atmospheric air, and replacement with an inert gas are known to one skilled in the art. In another aspect, the interior container of the desorption unit may be purged of atmospheric air and a vacuum is maintained in the system such that gas or steam replacement is not required. This vacuum system or a second or multiple vacuum systems may be used to remove the volatile and semi-volatile organic compounds from the container.

The heating system of the separation unit 30 may comprise multiple burners that provide heat indirectly to the contents of the container of the desorption unit. In one aspect, the fuel for the burners may comprise natural gas, fuel oil, coal, or diesel fuel. Other combustible fuels are known by one skilled in the art. In another aspect, fuel for the burners may comprise recycled liquid hydrocarbons or solid residue materials produced as products of the solid distillation system of the present invention. In a further aspect of the present invention, the burners are in a heating chamber external to the container of the desorption unit, and heat is transferred from the heating chamber to the desorption unit through a common barrier, heat conductive coils, or other methods of heat transfer readily available in the art. In another aspect, the container of the desorption unit may comprise electrical heating elements, wherein the heating elements are placed externally to the container or wrapped around the container. In one aspect, the desorption unit is heated by the heat unit preferably to temperatures ranging from about 300° C. to about 800° C., although temperatures somewhat less or somewhat greater than these temperatures may be used as required by the particular characteristics of the waste material entering the solid distillation system of the present invention.

As required, heat exhaust may be vented to the atmosphere from the separation unit 30. The waste after treatment in the separation unit 30, results in the general separation of the waste material into solid residue material, which is conveyed to a solid residue unit 40, and hydrocarbon gases, which are conveyed as gases to a condensing unit 50. At this stage, solid residue material may or may not have hydrocarbon compounds still associated with the solid material. Conveyance of the solid residue material to the solid residue unit 40 may be by any means suitable to the characteristics of the solid residue material. Systems for conveyance of the solid residue material from the separation unit 30 to the solid residue unit 40 may comprise conveyor belts, including for example a dragline conveyor, bucket elevators, screw conveyors or other conveyance systems generally known to one skilled in the art.

The solid residue unit 40 may comprise one or more of a system for drying, heat treatment of the solid residue material, separation of ferrous materials, or a system for milling or mixing of the solid residue material. Suitable systems for mixing or milling of the solid residue comprise pugmills, rotary mills, and other mechanical mixers readily known to one skilled in the art. A further processing step may be used in some embodiments to remove any remaining organic or hydrocarbon compounds that are associated with the solid material resulting from treatment in the desorption unit. The solid material is treated with a solution to remove the organic compounds and then the solid material is dried resulting in solid residue material. For example, the solid material leaving the desorption unit is subjected to a steam bath of hot water and the wash material or condensate material is collected and conveyed to the condensation unit 50. In one aspect, the solid residue material may be collected from the solid residue unit 40 without further treatment or separation, and used for other applications such as for fuel. In another aspect, the solid residue material may be conveyed to a solid residue separation unit 110. The solid residue separation unit 110 may comprise a number of systems for separation of the solid residue material based upon specific characteristics of the materials comprising the solid residue. In one aspect, the solid residue separation unit 110 may comprise a series of shaker screen separators to separate the components of the solid residue material based upon size or density. In a further aspect, the solid residue separation unit 110 may comprise a magnetic separator system to separate ferrous-containing materials in the solid residue from non-ferrous materials in the solid residue. The solid residue separation unit may further comprise systems and components known in the art for resolving heterogeneous mixtures of solid materials based upon size, density, metallic property, or other physical properties.

Organic compounds recovered from the separation unit 30 and the solid residue unit 40 may be conveyed to the condensation unit 50. The condensation unit 50 may comprise a number of components and systems as required by the characteristics of the waste material entering the solid distillation system of the present invention.

In one aspect, the condensation unit 50 may comprise one or more of a water quench scrubber, a Venturi scrubber, through a demister, or a series of chilled tubes, wherein the gases are conveyed through one or more components of the condensation unit and some or all of the gases condense, forming liquids and are collected. The gases may be moved by forced blowers, by vacuum pressure or other means for moving gases in systems. The liquids resulting from treatment of gases by the condensation unit are conveyed to a liquid hydrocarbon/water separator unit 60. The condensation unit 50 may further comprise a refrigerated chiller, wherein a chiller liquid is chilled, conveyed through a series of chilled tubes, and recirculated back to the refrigerated chiller. The refrigerated chiller lowers the temperature of the chiller liquid to temperatures low enough to effect condensation of at least some of the organic compounds in the gases. In one aspect, the chiller liquid circulated through the chilled tubes is water. In another aspect, the chiller liquid comprises an aqueous system of water and ethylene glycol. Other liquids suitable for chilling and condensation of gases are known to one skilled in the art, and such chiller liquids may be selected based upon characteristics such as heat capacity and the temperature range required to effect condensation of the components in the specific gases resulting from the waste material.

The present invention contemplates that some components of the gases removed from the waste material may represent gases which are not condensable. Non-condensable gases may be conveyed to a non-condensable gas treatment unit 100. In one aspect, the non-condensable gas treatment unit 100 may comprise gas scrubbers, filters, or a combination of scrubbers and filters as would be known to one skilled in the art, or as may be required by specific environmental regulations. In a further aspect, the non-condensable gas treatment unit 100 may comprise an activated charcoal bed over which the non-condensable gases are forced prior to venting the gases to the atmosphere, wherein the charcoal bed removes absorbable gas, liquid or particulate material or may comprise an enclosed flare which combusts and destroys the non-condensable gases or may comprise a micro-turbine system to generate power from the non-condensable gases.

In another aspect, condensate from the solid residue unit 40, which may comprise organic compounds and water, is conveyed to the condensation unit 50, which may further comprise a sump system. The sump system may collect both condensate from the solid residue unit 40 and condensate collected by the condensation unit 50 from the gases removed from the waste material. Liquid from the sump system, comprising generally water and liquid hydrocarbons, is conveyed to a liquid hydrocarbon/water separator unit 60. Systems capable of separating liquid hydrocarbons and aqueous components are known in the art, and may comprise such systems as an over and under baffle system separator wherein water is separated from liquid hydrocarbons. The water resulting from treatment by the liquid hydrocarbon/water separator unit 60 may be used or disposed of. For example, such water may be conveyed to a heat exchanger and cooling tower prior to conveyance into a water holding tank. The water may then be reused in various systems and components of the solid distillation system of the present invention. The liquid hydrocarbons which have been separated from water by the liquid hydrocarbon/water separator unit 60 are then conveyed to a liquid hydrocarbon separator unit 80.

The liquid hydrocarbon separator unit 80 may comprise a number of systems capable of separating mixtures of liquid hydrocarbons based upon physical and chemical characteristics, as well as any requirements for the organic compound product compositions. In one aspect, the liquid hydrocarbon separator unit 80 comprises a column distillation unit which separates organic compounds of the liquid hydrocarbon stream based upon the boiling points of the organic compounds therein. In a further aspect, the operation of the distillation column is automated and programmed based upon the desired products to be collected from the distillation column. In yet another aspect, the mixed liquid hydrocarbon separator unit 80 may comprise a process chromatography column which may separate the organic compounds of the mixed liquid hydrocarbon stream based upon molecular weight, hydrophobicity or physicochemical properties of the organic compounds. In another aspect, the mixed liquid hydrocarbon separator unit 80 may comprise systems designed to separate the organic compounds based upon freezing point. In another aspect, mixed liquid hydrocarbon separator unit 80 separates the organic compounds based upon a chemical characteristic such as the presence of sulfur or nitrogen moiety in the hydrocarbon. Other methods and systems for separating heterogeneous mixtures of liquid hydrocarbons are known to those skilled in the art, and are contemplated by the present invention.

Organic compound product compositions comprising pure or partially purified compositions of one or more organic compounds, chemically uniform organic compound compositions, or other compositions of liquid hydrocarbons are conveyed from liquid hydrocarbon separator unit 80 to liquid hydrocarbon holding units 90, wherein various liquids may be collected, stored or dispensed therefrom. The organic compound product compositions may be used in many applications including, but not limited to, use as a fuel source or as solvents. Other uses of the organic compound product compositions are known to those skilled in the art.

Other embodiments of the present invention, consistent with the spirit and content of the information disclosed herein, may be readily apparent to one skilled in the art. The order of the steps may be altered in some embodiments, or particular steps may be omitted as required by the particular use of the present invention.

Figure 2A:
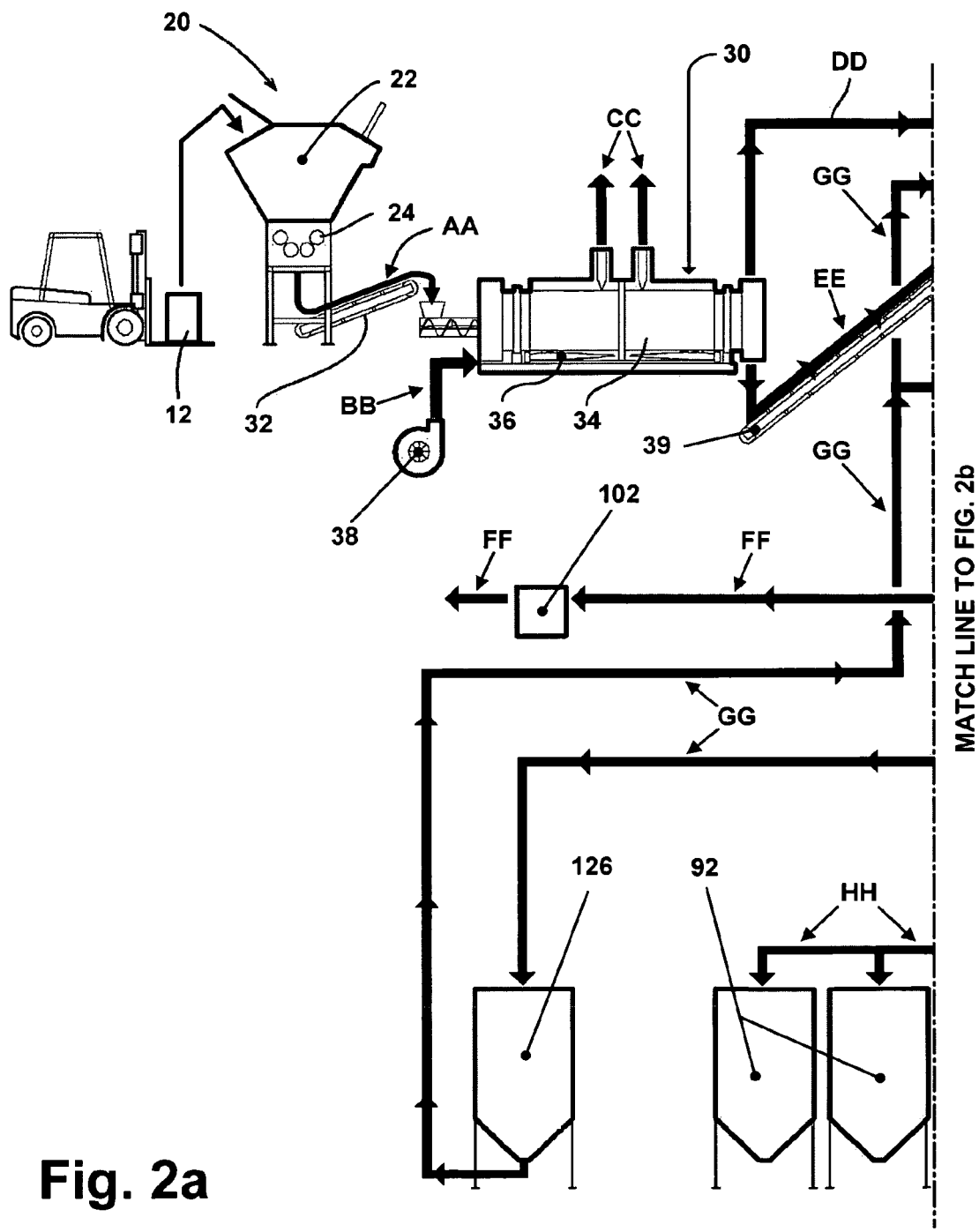
FIGS. 2A and 2B depict apparatus and methods in accordance with an embodiment of the present invention.
Figure 2B:
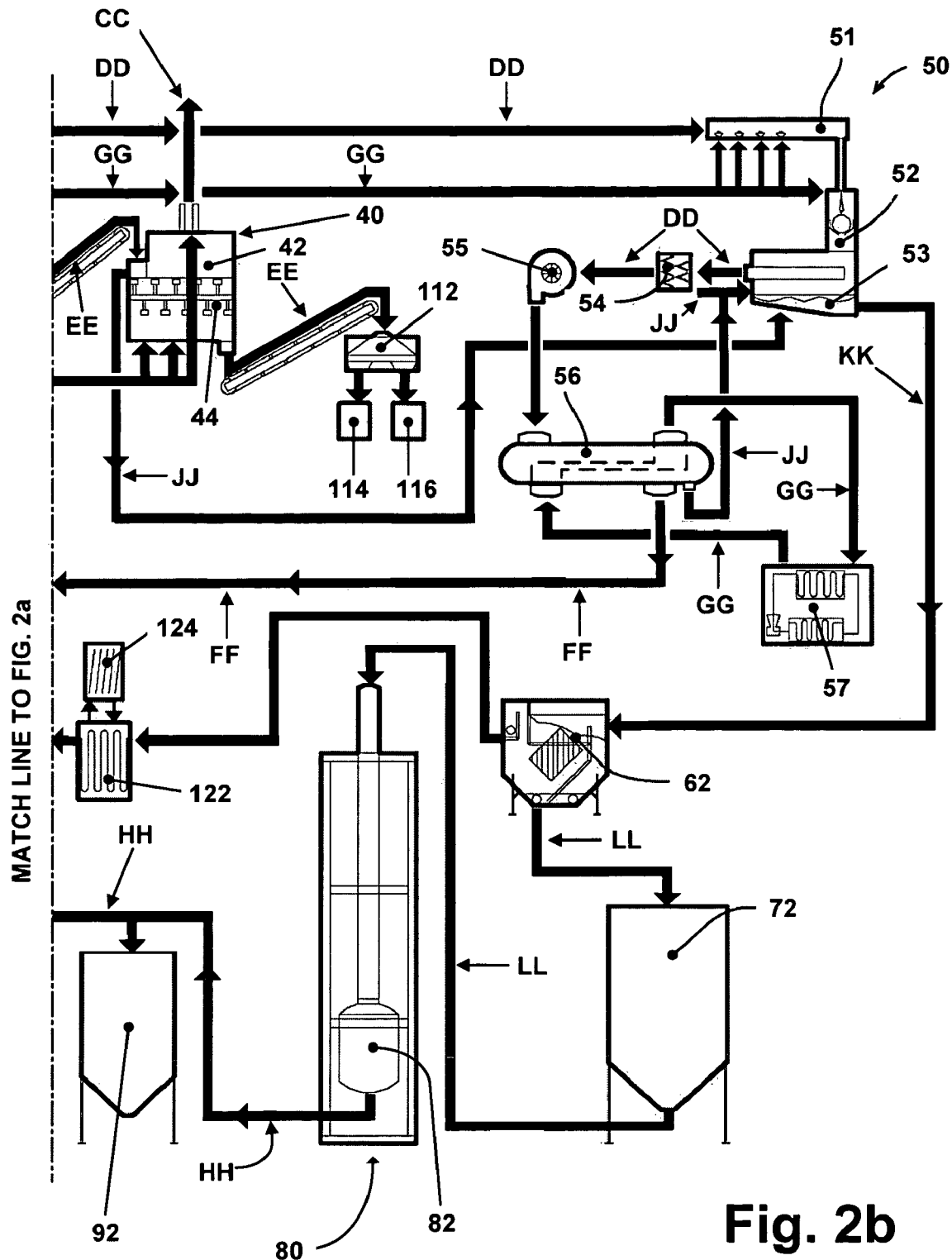

Referring now to FIGS. 2a and 2b, wherein an exemplary embodiment of the present invention is illustrated, comprising a reducing unit 20, a separation unit 30, a condensing unit 50, and a liquid hydrocarbon separator unit 80. For ease of understanding, the compounds capable of being volatilized are referred to herein as hydrocarbons. This use is not meant to be limiting in the description of compounds that are removed in the processes of the present invention. As used herein, hydrocarbons comprises alkanes, alkenes, aromatics and alkynes, which may be straight chained, branched chain, cyclic, or a combination of straight, branched and cyclic structures, hydrocarbons further comprises hydrocarbon compounds comprising various heteroatom or functional group substitutions, including but not limited to, halogens, oxygen, nitrogen and other heteroatoms known to those skilled in the art.

Generally, waste material 12, including but not limited to, hazardous and non-hazardous waste material, is shredded into a uniform feed stream AA by the reducing unit 20. The uniform feed stream AA is then fed into the separation unit 30 that vaporizes volatile and semi-volatile hydrocarbons in the solid waste material 12. Hydrocarbon vapors DD are then drawn off of the separation unit 30, and directed into the condensing unit 50, that produces a liquid hydrocarbon/water stream KK. This liquid hydrocarbon/water stream KK is then fed into the liquid hydrocarbon separator unit 80, comprising a distillation unit 82, to yield organic compound product compositions HH.

The solid distillation system of the present system can yield a broad range of hydrocarbons from heterogeneous hazardous and non-hazardous waste material to produce contaminant-free, uniform characteristic streams of high value hydrocarbons of the organic compound product compositions.

The reducing unit 20 may comprise a hopper 22 having a shredder 24. Shredder 24 may be operable to shred solid waste 12 into the uniform feed stream AA, wherein the uniform feed stream AA comprises smaller sized pieces than the solid waste 12. In one aspect, the shredder 24 generates pieces having a size of generally two inches or less. In another aspect, the shredder 24 generates pieces having a size larger than two inches. Preferably, the hopper 22 has a single, automatic door that encloses the hydraulic shredder 24. An exemplary hydraulic shredder is a 4-shaft hydraulic shredder manufactured by SSI Shredding Systems, Inc.

The reducing unit 20 may further comprise a hopper with an inner chamber having a conveyor 32, optionally contained within a chamber. The conveyor 32 can be a drag chain conveyor used to deliver a feed stream AA from the hopper 26 to the separation unit 30 through the chamber that is preferably purged of oxygen. An inert gas, such as argon, nitrogen, carbon dioxide or steam can be used to purge the oxygen from the chamber. A pneumatically operated double valve can be positioned to feed the waste into separation unit 30.

The separation unit 30 can comprise a desorption unit 34. The desorption unit 34 may comprise a container, such as a rotary drum, configured to be indirectly heated, such as by multiple burners 36 fueled with natural gas, fuel oil or diesel fuel. In one aspect, the multiple burners 36 are fed with combustion air BB, wherein the combustion air BB is directed to the multiple burners by a combustion air blower 38. The separation unit 30 may further comprise a system for heat exhaust CC from the multiple burners 36. In a further aspect, the desorption unit 34 may be heated by electrical coils. Other heating systems which are useful for heating the desorption unit 34 would be known to one skilled in the art.

The desorption unit 34 is preferably heated to temperatures ranging from about 300° C. to about 800° C. for a specified time, which may be from approximately 30 to approximately 120 minutes. The desorption unit 34 is operable over a temperature range wherein the hydrocarbons are volatized from the shredded solid waste. In a further aspect, the desorption unit 34 is operable over a temperature range wherein the chemical structure is maintained of the hydrocarbons which are volatized from the shredded solid waste. In yet another aspect, the desorption unit 34 is operable to function under substantially oxygen-free or anaerobic conditions such that oxidation reactions or combustion of the vaporized hydrocarbons is minimized. In another aspect, the desorption unit 34 is operable at a slight negative pressure relative to atmospheric pressure.

The desorption unit 34 may connect to the condensing unit 50 that draws off the hydrocarbon vapors or gases, DD. In one aspect, the gases DD are drawn off with the aid of a vacuum from the condensing unit 50. The condensing unit comprises systems that condense the gases DD into liquid form.

The desorption unit 34 may further comprise a connection 39 for conveying solid reside material EE to the solid residue unit 40 via a pneumatically operated double tipping valve, wherein the solid residue unit 40 may cool the solid residue material EE. The solid residue unit 40 may comprise a pugmill mixer unit 44. The solid residue unit may further comprise a steam scrubber unit 42. In one aspect, the condensate JJ from the steam scrubber unit is collected and conveyed to a sump unit 53 of the condensing unit 50. In another aspect, the solid residue unit 40 may comprise a system for heat exhaust CC from the steam scrubber.

In one aspect, the condensing unit 50 may comprise a vapor recovery unit operated to draw the vaporized hydrocarbons DD from the desorption unit 34 under a slight negative pressure. The vapor recovery unit may further comprise aspects to remove particulate from the gas stream and condense the hydrocarbon vapors DD, producing a liquid hydrocarbon/water stream KK. Water can be removed from the liquid hydrocarbon/water stream KK by an oil and water separator unit 62. The water thus removed by the oil and water separator unit 62 may be reused in the solid distillation system for quenching of the gas vapors or used to provide an inert vapor in the desorption unit 34. The liquid hydrocarbon stream LL may be accumulated in a tank 72, and fed into liquid hydrocarbon separator unit 80, comprising the distillation unit 82.

The distillation unit 82 may comprise a multi-stage, packed distillation column. The column is operated to separate the hydrocarbons by boiling points to be determined by the type of product to be obtained from the liquid hydrocarbon stream LL.

In one aspect of the present invention, waste material 12 is fed into the inner chamber of the hopper 22. In a further aspect of the present invention, the waste material 12 is containerized, such as in metal 55 gallon drums. In another aspect, the waste material 12 may be bulk material that is not containerized. Once the material is placed in the hopper, the automatic door closes. The inner chamber of the hopper is purged of oxygen through the introduction of an inert gas, such as nitrogen or carbon dioxide, which replaces the oxygen in the inner chamber. Once the inner chamber reaches an anaerobic atmosphere, the shredder 24 shreds the containerized material 12 into pieces having sizes of, preferably, two inches or less, which becomes the uniform feed stream AA.

The uniform feed stream AA then is transported to the desorption unit 43 by the conveyor 32. Preferably, the conveyor, of a drag chain type, carries the shredded material through the chamber that is purged of oxygen by the use of an inert gas. The shredded material from the conveyor 32 is then fed, via the pneumatically operated double valve, into the desorption unit 34, which unit 34 is heated to a specific temperature and treated therein.

The solid residue material is discharged from the desorption unit 34 through the pneumatically operated double valve into the solid residue unit 50, where the solid residue material is cooled. The solid residue material is conveyed to a separation unit 112. In one aspect, the separation unit comprises a magnetic separator to remove ferrous-containing material 114 from non-ferrous material 116. The separation unit 112 may further comprise a shaker type separation unit to separate components of the solid residue. The recovered metal can be used as ferrous scrap. Reclaiming the solid material is the process of treating a solid material to remove organic compounds from to solid material. Reclaiming the organic compounds to form organic compound product compositions comprises treating a waste material comprising organic compounds associated with solid material to separate the organic compounds from the solid material and optionally, further processing the organic compounds.

The hydrocarbon vapors DD processed from the desorption unit 34 are recovered through a condensation and cooling process in the condensing unit 50. The hydrocarbon vapors DD pass through the condensing unit 50 that may comprise a water quench scrubber unit 51, a Venturi scrubber unit 52, a demister unit 54 and a chilled condensing tube unit 56 that lowers the temperature, and allows the vapors DD to condense. The condensing unit 50 may further comprise a process gas blower 55 to force process gases DD into the chilled condensing tube unit 56. Chilled liquid, which has been chilled in the chiller unit 57, is circulated through the tubes of the chilled condensing tube unit 56. As shown in FIG. 2b, the liquid chilled in the chiller unit 57 is water GG. In other embodiments of the present invention, the chilled liquid may be any suitable liquid that is capable of condensing gas vapors. The condensing unit 50 may further comprise a sump unit 53 for collection of condensate JJ comprising gas vapors DD which have condensed. In one aspect, the condensate collected in the condensing unit 50 may be mixed with condensate JJ collected from the solid residue unit 40 to form collectively the liquid hydrocarbon/water stream KK.

In one aspect of the present invention, the waste material 12 may comprise hydrocarbons which do not result in gases that can be condensed in the condensing unit 50. In one embodiment, the non-condensable gases FF are vented from the chilled condensing tube unit and passed over activated charcoal 102 before venting to the atmosphere.

The liquid hydrocarbon/water stream KK is then processed in an oil and water separator 62, such as an over and under baffle system separator to remove water from the mixture. The water-free liquid hydrocarbon stream LL, which may or may not be a mixture of different hydrocarbon molecules, is then fed into a liquid hydrocarbon separator unit 80, comprising a multi-stage packed distillation column 82, which separates hydrocarbon molecules according to specific boiling points of the chemically different hydrocarbon molecules to yield a liquid hydrocarbon stream HH. In one aspect, the use of the multi-stage packed distillation column 82 results in liquid hydrocarbon stream HH comprising organic compound product compositions substantially free of water and other contaminants. In another aspect, the resulting products of the distillation column 82 are a liquid hydrocarbon stream HH which comprises organic compound product compositions comprising a mixture of distillates from one or more boiling point cutoffs. The liquid hydrocarbon stream HH is collected into holding tanks 92 which collect the various organic compound product compositions obtained from the distillation column 82.

In one embodiment, the water GG that is collected from the oil and water separator 62 is conveyed through a heat exchanger 122 and a cooling tower 124 before returning the water GG to a water holding tank 126.

As used herein, organic compound product compositions will be understood by those of skill in the art to include organic liquids, organic solvents and other organic compound compositions that are primarily hydrocarbons, as used herein, and which are used with other organic compound such as, but not limited to, to dissolve other, generally nonpolar substances. Organic compound compositions are found in many products, and are critical to their effectiveness. Organic compound compositions, for example, help paint to flow and form a smooth surface on whatever is being painted. Organic compound compositions improve the cleaning ability of many household cleaners, including hard surface cleaners, window cleaners, floor polishes and automotive cleaners, just to name a few. They are also an important part of beauty and cosmetic products such as nail polish and removers, hairspray and antiseptics. The organic compounds that are reclaimed by the present invention can be reclaimed from solid materials, such as containers for the above-listed products or from the solid material itself, and the reclaimed organic solvents can be reused in the above-listed products.

In the distillation unit, the organic compounds, separated from the hazardous material, are separated by methods known to those skilled in the art. Generally, the boiling point differences in compounds are used to separate the compounds into different products. For example, reclaimed organic compounds include, but are not limited to, aliphatic hydrocarbons, aromatic hydrocarbons, chlorinated hydrocarbons, alcohols, glycols and glycol ethers, ethers, esters, ketones or aldehydes, such as acetones, acrylamide, benzene, carbon disulfide, ethylene oxide, n-hexane, hydrogen sulfide, methane, methyl mercaptan, methyl-n-butyl ketone, methylene chloride (dichloromethane) organochlorines, organophosphates, perchlorethylene, styrene, toluene, 1,1,1-trichloroethane (methyl chloroform) trichloroethylene, vinyl chloride, xylene, methyl ethyl ketone, cyclohexanes, ethylene glycol, turpentine, white spirits (naphtha safety solvent), acetaldehyde, acetonitrile, carbon disulfide, cyclohexenes, diethyl ether, ethanol, ethyl acetate, methanol, pentane, petroleum ether, propanol, pyridine, tetrahydrofuran, vinyl acetate, or propane.

Separation and purification of the reclaimed organic compounds use methods known to those skilled in the art. For example, condensed liquid solutions obtained from the condensation of the volatilized and semi-volatilized compounds are separated into different chemical compound solutions by physical and chemical characteristics. The physical and chemical characteristics of most chemical compounds are known and can be separated by methods known to those skilled in the art. For example, the condensed liquid solutions obtained from the condensation of the volatile and semi-volatile compounds are separated by boiling the liquid solution and capturing the vapor produced at different temperatures and condensing it to yield specific chemical compound solutions. In one embodiment, hydrocarbons are identified and grouped according to boiling points. One method separates hydrocarbons with boiling points of 0° F. to 450° F. (from approximately −17.8° C. to approximately 232° C.) from those having boiling points of 450° F. (approximately 232° C.) and above. For example, vinyl chloride boils at approximately −17° C., Freon 152 boils at approximately 30.7° C., chloroacetic acid boils at approximately 233° C. and each of these can be separated from a mixed solution of several chemical compounds. The separations may also be accomplished by resins that differentially bind specific chemicals.

The methods of the present invention comprise removing volatile and semivolatile compounds from hazardous waste by operation of the apparatus and systems taught herein, and substantially isolating, purifying or concentrating the removed organic compounds in organic compound product compositions. Such organic compound product compositions may be gases, liquids or solids. The methods of the present invention comprise reclaiming solid residue materials, formerly associated with hazardous organic compounds or waste material, by treating the hazardous material so that the solid material is no longer associated with the hazardous organic compounds, and the solid residue material is no longer considered hazardous as defined by the EPA. A method for reclaiming solid residue material comprises treating hazardous waste comprising solid materials associated with volatile and semivolatile organic compounds, removing the volatile and semivolatile organic compounds from the solid material, separating the organic compounds by physical or chemical characteristics, and reclaiming the remaining solid residue material. The present invention comprises isolating at least one organic compound product composition that is substantially chemically uniform by a physical or chemical characteristic. The present invention comprises methods for producing organic compound product compositions comprising a mixed aromatic solvent product composition that are isolated from a water/organic mixture by boiling point differentiation. Such mixed aromatic solvent product compositions may be used for degreasing applications. Additionally, the present invention comprises methods for producing organic compound product compositions comprising solutions comprising hydrocarbons with high boiling points that are effective as lubricants. The organic compound product compositions that are isolated by the systems and methods of the present invention may be isolated using one or more physical characteristics or one or more chemical characteristics. For example, an organic compound product composition may comprise multiple aromatic compounds that all have a boiling point above a certain temperature. An organic compound product composition comprising multiple aromatic compounds that are chemically uniform by at least one characteristic is referred to as a mixed aromatic solution. Such product compositions may be separated by boiling point separation alone or by multiple separations to yield more purified organic compound product compositions.

Systems and methods of the present invention comprise treating waste material to reclaim hydrocarbon or organic compound materials and solid materials that are not volatilized but that can be used for other applications. In general, systems for treating waste material comprise forming an inlet feed stream of waste material which may comprise solids, liquids or mixtures of solids and liquids, comprising at least one organic compound, which is also referred to herein as at least one hydrocarbon. The systems may comprise an inlet feed stream of waste, a reducing unit, a separation unit, a condensing unit, a solid residue unit, and a distillation unit. More than one of the system components may be used in the systems or methods of the present invention. A separation unit, comprising a container having an anaerobic atmosphere that is substantially free of oxygen, is heated to vaporize at least one hydrocarbon from the waste material in the waste stream. Optionally, the waste stream enters at one end of the container, which may be an upwardly inclined, slowly rotating drum of a length such that the transit time within the container is sufficient to vaporize substantially all of the volatile and semi-volatile organic compounds of the waste stream. Rotation of the enclosed container allows for the waste stream to be moved so that the surfaces of the waste are exposed to the heat and anaerobic environment. The components of the systems function to reclaim the organic compounds and the nonvolatile solids and thus, recycle the waste. A component of the system, the separation unit, produces at least one hydrocarbon gas by vaporizing at least one hydrocarbon in the inlet feed stream. Other components include a condensing unit, through which the hydrocarbon gas is directed, produces a liquid hydrocarbon stream, a distillation unit through which the liquid hydrocarbon stream is directed and produces at least one organic compound product composition, a solid residue unit provides the solid residue material, and a reducing unit provides the feed stream of waste. At least one hydrocarbon gas is formed by heating the inlet stream of waste temperatures ranging from about 300° C. to about 800° C. for a sufficient amount of time, optionally ranging from approximately 30 to 120 minutes. A mixture of hydrocarbon gases is condensed and the different hydrocarbons are separated into compositions that share at least one similar characteristic, such as boiling at or above a specific temperature, to form somewhat chemically uniform compositions, organic compound product compositions. The solid material of the waste material is treated to remove the volatile and semi-volatile hydrocarbons and may be further washed, dried, separated or milled for use in other applications.

Methods of the present invention may comprise providing a feed stream of waste to a separation unit, vaporizing in the separation unit, under anaerobic conditions, at least one hydrocarbon in the feed stream, thereby producing at least one hydrocarbon gas; condensing the hydrocarbon gas, thereby producing a hydrocarbon liquid stream, distilling the hydrocarbon liquid stream, and, collecting one or more substantially chemically uniform organic compound product compositions. Methods may also comprise reducing the size of the waste to form the feed stream of waste under aerobic or anaerobic conditions. The waste stream is heated at temperatures that are sufficient to vaporize or volatilize hydrocarbon molecules and for an amount of time that is sufficient to volatilize substantially all of the volatile and semi-volatile hydrocarbon compounds in the inlet waste stream. Anaerobic or inerted conditions may comprise adding a gas or steam to limit oxidation of the hydrocarbons produced from the inlet feed stream. The methods are useful for reclaiming materials from waste materials.

All patents, patent applications and references included herein are specifically incorporated by reference in their entireties.

It should be understood, of course, that the foregoing relates only to preferred embodiments of the present invention and that numerous modifications or alterations may be made therein without departing from the spirit and the scope of the invention as set forth in this disclosure.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

Waste material comprising two thousand pounds of drummed solvent soaked rag material arrived at the treatment site in 8 metal 55 gallon drums. The waste material was added to the shredder and continuously fed into the desorption unit. The transit time through the rotating drum of the desorption unit was approximately 60 minutes at 750° F. (approximately 399° C.). The solid material that exited the rotating drum represented 45%, or 900 pounds, of the initial waste material. Of this solid material, 64% was carbon mineral material and 36% was metal. The volatile and semi volatile compounds were removed by vacuum continuously and condensed by the vapor recovery unit of the condensing unit. The resulting liquid solution, representing 55% of the initial waste material, entered the distillation unit where it was processed. One product, a mixed aromatic solvent, was recovered in the in the 0° F. to 450° F. distillation cut, representing 47% of the initial waste material, or 935 pounds. The mixed aromatic solvent recovered was mixed with other recovered like solvents and was sold for use in cleaning petroleum storage tanks and barges.

What is claimed is:

1. A method for providing solid material substantially free from contact with an organic compound comprising,
    a) providing to a desorption unit a feed stream of a solid material in contact with at least a known organic compound having a vaporization temperature;
    b) heating in the desorption unit for a time ranging from approximately 30 to 120 minutes, under anaerobic conditions, the solid material in contact with the known organic compound and vaporizing the known organic compound, thereby desorbing the known organic compound from the solid material by producing a gas comprising the known organic compound, wherein the known organic compound is not chemically modified by heating, and wherein the solid material is substantially free from contact with the known organic compound;
    c) condensing the gas comprising the known organic compound, thereby producing a liquid comprising the known organic compound;
    d) optionally, separating the known organic compound in the liquid, from the liquid; and
    e) collecting the known organic compound to form a substantially chemically uniform organic compound product composition.

2. The method according to claim 1, further comprising reducing the size of the solid material, prior to providing the feed stream of solid material.

3. The method according to claim 2, wherein reducing the size of the solid material is operated under anaerobic conditions.

4. The method according to claim 1, wherein heating the known organic compound in the desorption unit under anaerobic conditions comprises adding a gas or steam into the desorption unit to limit oxidation of the known organic compound.

5. The method of claim 1, further comprising, after heating the solid material in the desorption unit to desorb the known organic compound from the solid material, washing, drying, separating or milling the solid material to form solid residue material.

6. A method for reclaiming materials from hazardous solid material, comprising,
    a) providing a feed stream of a solid material in contact with at least one known organic compound having a vaporization temperature to a desorption unit wherein the solid material is indirectly heated in an anaerobic environment for a time ranging from approximately 30 to 120 minutes;
    b) treating the solid material by desorbing the at least one known organic compound from the solid material by heating the at least one known organic compound in the feed stream and vaporizing the at least one known organic compound, thereby producing at least one organic compound gas, wherein the at least one known organic compound is not chemically modified by vaporization of at least one organic compound, and wherein the solid material is substantially free from contact with the at least one known organic compound;
    c) condensing the at least one organic compound gas; and
    d) collecting at least one condensed organic compound to produce at least one organic compound product composition.

7. The method of claim 6, wherein treating the solid material further comprises, after heating at least one known organic compound to the vaporization temperature of the at least one known organic compound, washing, drying, separating or milling the solid material remaining after vaporization of the at least one known organic compound to form solid residue material.

8. The method of claim 7, wherein desorbing the solid material remaining after vaporization of the at least one known organic compound comprises placing the solid material in a magnetic field to remove ferrous-containing material.

9. The method of claim 6, wherein the at least one organic compound product composition comprises aliphatic hydrocarbons, aromatic hydrocarbons, chlorinated hydrocarbons, alcohols, glycols and glycol ethers, ethers, esters, ketones or aldehydes.

10. The method of claim 9, wherein the at least one organic compound product composition comprises acetones, acrylamide, benzene, carbon disulfide, ethylene oxide, n-hexane, hydrogen sulfide, methane, methyl mercaptan, methyl-n-butyl ketone, methylene chloride (dichloromethane) organochlorines, organophosphates, perchlorethylene, styrene, toluene, 1,1,1-trichloroethane (methyl chloroform) trichloroethylene, vinyl chloride, xylene, methyl ethyl ketone, cyclohexanes, ethylene glycol, turpentine, white spirits (naphtha safety solvent), acetaldehyde, acetonitrile, carbon disulfide, cyclohexenes, diethyl ether, ethanol, ethyl acetate, methanol, pentane, petroleum ether, propanol, pyridine, tetrahydrofuran, vinyl acetate, or propane.

11. The method of claim 6, further comprising reducing the size of the solid material in contact with the known organic compound prior to providing the feed stream of solid material in contact with the known organic compound to the desorption unit.

* * * * *

UNITED STATES PATENT AND TRADEMARK OFFICE
CERTIFICATE OF CORRECTION

PATENT NO. : 7,642,394 B1 Page 1 of 1
APPLICATION NO. : 11/077605
DATED : January 5, 2010
INVENTOR(S) : Carle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Sixteenth Day of November, 2010

David J. Kappos
*Director of the United States Patent and Trademark Office*